United States Patent
Hibshoosh et al.

(10) Patent No.: US 9,973,334 B2
(45) Date of Patent: May 15, 2018

(54) HOMOMORPHICALLY-CREATED SYMMETRIC KEY

(71) Applicant: Cisco Technology, Inc., San Jose, CA (US)

(72) Inventors: Eliphaz Hibshoosh, Tel Aviv (IL); Aviad Kipnis, Efrat (IL); Andrew Sinton, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 15/068,591

(22) Filed: Mar. 13, 2016

(65) Prior Publication Data

US 2017/0070340 A1 Mar. 9, 2017

(30) Foreign Application Priority Data

Sep. 3, 2015 (IL) .......................................... 241141

(51) Int. Cl.
*H04L 29/06* (2006.01)
*H04L 9/00* (2006.01)
(Continued)

(52) U.S. Cl.
CPC ............ *H04L 9/008* (2013.01); *H04L 9/0838* (2013.01); *H04L 9/3026* (2013.01)

(58) Field of Classification Search
CPC ... H04L 9/008; H04L 9/0838; H04L 9/30226; H04L 9/3026
See application file for complete search history.

(56) References Cited

U.S. PATENT DOCUMENTS 8,627,107 B1 * 1/2014 Kennedy ................. G06F 21/62
                                                                380/28
8,630,422 B2    1/2014 Gentry
(Continued)

FOREIGN PATENT DOCUMENTS

WO    WO 2014/016795        1/2014

OTHER PUBLICATIONS

X. Yi et al., Homomorphic Encryption and Applications, SpringerBriefs in Computer Science, 2014, pp. 27-46. (Year: 2014).*

(Continued)

*Primary Examiner* — Sarah Su
(74) *Attorney, Agent, or Firm* — Samuel M. Katz (57) ABSTRACT

One embodiment of the invention includes a method, including performing, a symmetric homomorphic encryption of a secret $S_A$ with a cryptographic key H as input yielding a homomorphic encryption result $S_A^*$, sending $S_A^*$ for mathematical combination by at least one device with at least one secret $S_B$ yielding G*, the device A not having access to $S_B$, the at least one device not having access to $S_A$ and not having access to H, receiving G*, performing a symmetric homomorphic decryption of data based on G* with H as input yielding a first decrypted output, determining a symmetric cryptographic key KA based on the first decrypted output for secure communication with a first device which is operationally connected to, or includes, a tamper resistant security system including $S_A$ and $S_B$ therein, securing data using KA yielding secured data, and sending the secured data to the first device.

20 Claims, 8 Drawing Sheets

(51) Int. Cl.
*H04L 9/30* (2006.01)
*H04L 9/08* (2006.01)

(56) References Cited

U.S. PATENT DOCUMENTS

| | | | | |
|---|---|---|---|---|
| 2011/0264920 | A1* | 10/2011 | Rieffel | H04L 9/008 713/189 |
| 2015/0172258 | A1* | 6/2015 | Komano | H04L 9/0816 380/259 |
| 2015/0188700 | A1* | 7/2015 | Ben Saied | H04L 9/0838 380/44 |
| 2015/0358153 | A1* | 12/2015 | Gentry | H04L 9/28 380/30 |
| 2016/0352810 | A1* | 12/2016 | Yuan | H04L 67/06 |

OTHER PUBLICATIONS

ETSI TS 103 162, Access, Terminals. Transmission and Multiplexing (ATTM): Integrated Broadband Cable and Television Networks; K-LAD Functional Specification (2010) Can be seen at: http://www.etsi.org/deliver/etsi_ts/103100_103199/103162/01.01.01_60/ts_103162v010101p.pdf.

Kipnis, Aviad et al.; Efficient Methods for Practical Fully-Homomorphic Symmetric-Key Encryption, Randomization, and Verification (2012) Can be seen at http://eprint.iacr.org/2012/637.

Lin, Hsiao-Ying: An Efficient Solution to the Millionaires' Problem Based on Homomorphic Encryption; In Apllied Cryptography and Network Security, pp. 456-466. Springer Berlin Heidelberg. 2005.

Malkhi, Dahlia; Fairplay—A Secure Two-Party Computation System (2004); In Proceedings of the 13th conference on USESNIX Security Symposium—vol. 13 (SSYM'04), vol. 13. USENIX Association, Berkeley, CA, USA, 20-20.

Peter, Andreas; Efficiently Outsourcing Multiparty Computation Under Multiple Keys, Information Forensics and Security, IEEE Transactions on , vol. 8, No. 12, pp. 2046, 2058. Dec. 2013 doi: 10.1109/TIFS.2013.2288131.

Sharma, III; Fully Homomorphic Encryption Scheme With Symmetric Keys, PhD diss., Department of Computer Science & Engineering University College of Engineering, Rajasthan Technical University, Kota, 2013.

Tebaa, Maha; Homomorphic Encryption Applied to the Cloud Computing Security, Proceedings of the World Congress on Engineering 2012 vol. I WCE 2012, Jul. 4-6, 2012, London, U.K.

Wong, Wai Kit; Secure Query Processing With Data Interoperability in a Cloud Database Environment: In Proceedings of the 2014 ACM SIGMOD Intl'l conferenice on Management of data (SIGMOD '14). ACM, New York, NY, USA, 1305-1406. DOI=10.1145/2588555.2588672.

Yao, Andrew C.; Protocols for Secure Computations; (Nov. 1982); FOCS. 23rd Annual Symposium on Foundations of Computer Science (FOCS 1982): 160-164.

Yu, Ching-Hua; Randomised Secure Two-Party Computation for Modular Conversion, Zero Test, Comparison, MOD and Exponentiation, IACR Cryptology ePrint Archive 2011 (2011): 560.

* cited by examiner

HOMOMORPHICALLY-CREATED SYMMETRIC KEY

RELATED APPLICATION INFORMATION

The present application claims priority from Israel Patent Application S/N 241141 of Cisco Technologies Inc. filed on 3 Sep. 2015.

TECHNICAL FIELD

The present disclosure generally relates to homomorphic encryption and symmetric key creation.

BACKGROUND

Homomorphic encryption is a form of encryption that allows computations to be carried out on ciphertext, thus generating an encrypted result which, when decrypted, matches the result of operations performed on the plaintext. Using symmetric homomorphic encryption, for instance, one computer could use its symmetric homomorphic-encryption key to encrypt two plaintext numbers, and then another computer could add the two encrypted numbers and send the result to the first computer which decrypts the result using its symmetric homomorphic-encryption key and thus has the sum of the two plaintext numbers. A variety of homomorphic encryption systems are known in the art.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment, a method, including performing, by a processor in a device A, a symmetric homomorphic encryption of a secret SA with a cryptographic key H as input yielding a homomorphic encryption result SA*, sending, on a communication interface in the device A, the result SA* for mathematical combination by at least one device with at least one secret SB yielding a result G*, the device A not having access to the at least one secret SB, the at least one device not having access to the secret SA and not having access to the cryptographic key H, receiving, on the communication interface, the result G*, performing, by the processor, a symmetric homomorphic decryption of data based on the result G* with the cryptographic key H as input yielding a first decrypted output, determining a symmetric cryptographic key KA based on the first decrypted output for secure communication with a first device which is operationally connected to, or includes, a tamper resistant security system, the tamper resistant security system including the secret SA and the at least one secret SB therein, the tamper resistant security system being operative to generate the symmetric cryptographic key KA based on the secret SA and the at least one secret SB, securing data, by the processor, using the symmetric cryptographic key KA yielding secured data, and sending, by a transmission element, the secured data to the first device which is operationally connected to, or includes, the tamper resistant security system.

DETAILED DESCRIPTION

By way of introduction, secure communication between a managing party and a secure client may be enabled using a symmetric key. The key is typically known only to the managing party and the secure client and is typically derived from a set of independent secrets, at least one of which is held by the managing party and at least one other secret is held by another party or parties. The managing party and the other party typically do not share the secrets yet the managing party is able to derive the key. Creation of the symmetric key by the managing party typically uses a protocol that includes homomorphic encryption such that the key is created without sharing of the secrets. The same secrets that the symmetric-key is derived from by the managing party are also present in the secure client to allow generation of the key within the secure client, generally without homomorphic encryption being involved, typically upon power up and thus enable the secure communication between the managing party and the secure client. The secrets are compartmentalized while the result of the computation may be known to the party who initiated the protocol, e.g., the managing party. Thus an attacker of the managing party's back-office generally cannot obtain the secrets of the other party or parties. A secret in the client may be unique per client, or common to many, or all, clients. The key generated in the client is said to have multi-factor protection as an attacker of the secure client who wants to generate the key typically has to extract all the secrets involved in the generation of the key; thus the attacker generally has to overcome each of the embedded-secret's protection, e.g., in software and/or hardware. As an example, consider the case of a key-ladder controlled by several entities with their compartmentalized secrets whose output key is known to one of the entities follows. In this example, entity A or entity B creates its own private symmetric-key $K_A$ or $K_B$, respectively, depending on the particular back-office protocol that they run between them and based on their unshared secrets or their variants. The process of creating the keys in back office and generating keys in the secure clients is typically very efficient to support a large population of devices and/or a highly dynamic process of updating keys. Each party autonomously creates its own secret and there is no central authority that exists for all secrets of all parties. Thus the process of key creation is based on providing distributed security, avoiding a single point of compromise.

Figure 1:
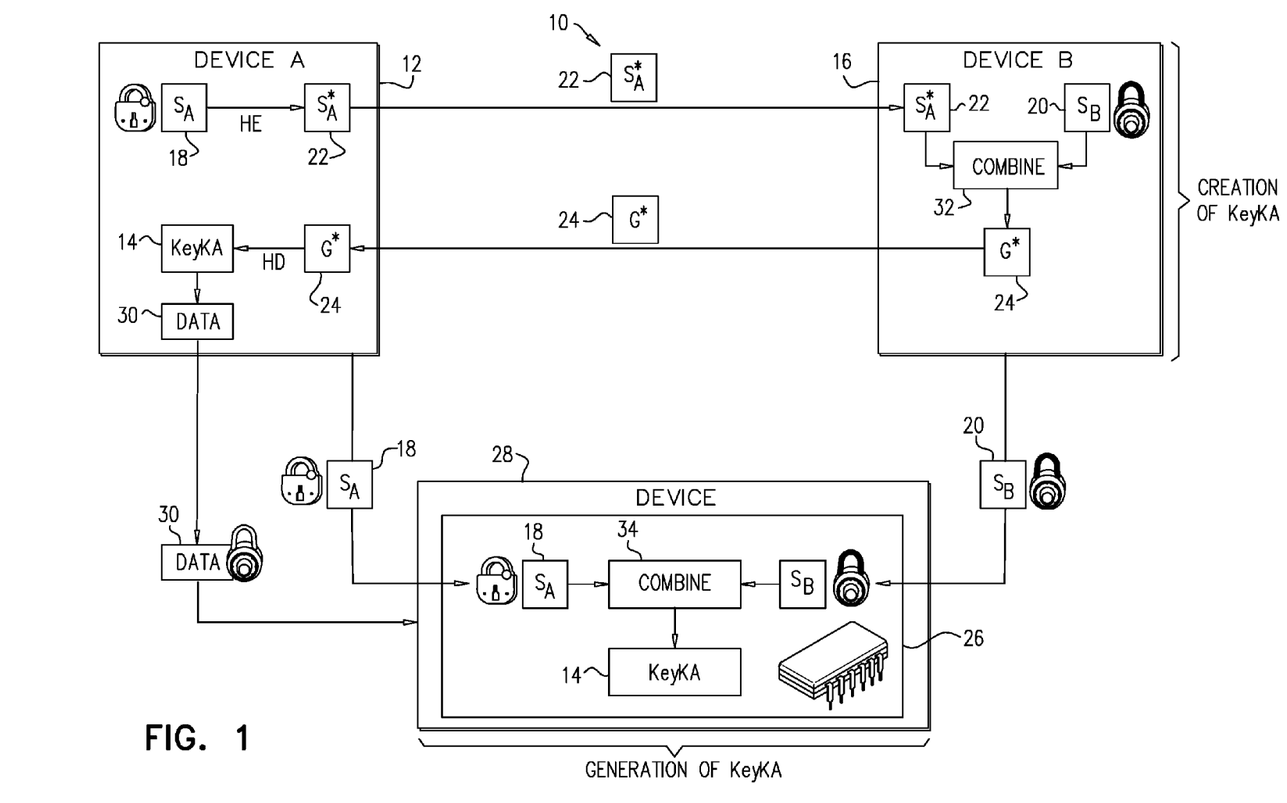
FIG. 1 is a block diagram view of a symmetric key creation system constructed and operative in accordance with an embodiment of the present disclosure.

Reference is now made to FIG. 1, which is a block diagram view of a symmetric key creation system 10 constructed and operative in accordance with an embodiment of the present disclosure. The symmetric key creation system 10 is typically implemented in a device 12 also labeled, and referred to herein, as device A of entity A in FIG. 1. Device A creates a symmetric key, KA (block 14), based on an information exchange between another device 16 also labeled, and referred to herein, as device B of entity B in FIG. 1. Device A has its own secret $S_A$ (block 18) which is kept secret from device B. Device B has its own secret $S_B$ (block 20) which is kept secret from device A. The creation of the symmetric key KA is based on a mathematical combination of secret $S_A$ and secret $S_B$ described now in more detail. Device A performs a homomorphic encryption of secret $S_A$ yielding a result $S_A^*$ (block 22). Result $S_A^*$ is passed by device A to device B. Device B mathematically combines (block 32) the result $S_A^*$ with its own secret B yielding a result G* (block 24). Device B passes the result G* (block 24) to device A. Device A performs a homomorphic decryption of the result G* to yield the symmetric key, KA (block 14).

By way of example, secret $S_A$ may be a random value and secret $S_B$ may include coefficients (or values to determine coefficients) of a function F(x) where the function F(x) is evaluated with the result $S_A^*$ substituted for x, i.e., $F(S_A^*)$. By way of example, function F may serve in the client device 28 as a de-obfuscation function whose input is embedded in the secret embedded in a secure one-time programmable (OTP) with the client device 28. In this example, the result G* is equal to $F(S_A^*)$. So performing a homomorphic decryption of G* yields the homomorphic decryption of $F(S_A^*)$ which is F(SA). Therefore, device A determines the symmetric key KA, which is equal to F(SA) without ever knowing the function F or the coefficients of F. This example is explained in more detail with reference to FIG. 3. It will be appreciated that instead of the secret $S_A$ being a random value and secret $S_B$ including coefficients (or values to determine coefficients) of a function F(x), secret $S_A$ may include the coefficients (or the values to determine coefficients) of a function J and secret $S_B$ may include a value for substituting into the function J. Function J is described in more detail below with reference to FIG. 3.

The secrets $S_A$ and $S_B$ are typically independently embedded in a tamper resistant security system 26, by device A and device B, respectively, without device A knowing secret $S_B$ and without device B knowing secret $S_A$. The tamper resistant security system 26 is typically implemented within a device 28, for example, a set-top box or a mobile device or operationally connected to the device 28 via a smart card or USB (Universal Serial Bus) token, by way of example only. The tamper resistant security system 26 typically includes a secure file system (e.g., an OTP memory) and a secure crypto-processor for performing cryptographic operations including generating cryptographic keys and evaluating function F in gates. For example, $S_A$ may be embedded by entity A in the protected OTP memory, and F may be implemented in the gates of the tamper resistant security system 26 by entity B (the chip manufacturer. The tamper resistant security system 26 may be implemented in a smart card, video-decoder chip or SIM, by way of example only. The tamper resistant security system 26 is operative to generate (block 34), typically without using homomorphic encryption, the symmetric cryptographic key KA by evaluating F(SA) based on the secret $S_A$ and the secret $S_B$ embedded therein. Generally, the secrets $S_A$ and $S_B$ are not held by a Trusted Third Party (TTP).

The symmetric key KA may be used by device A to secure data 30 which is sent to the device 28. The data 30 may be media content, a cryptographic key, key generation data, or any other suitable data, by way of example only. Securing the data 30 may include encrypting the data 30 and/or generating a digital signature or a MAC (message authentication code) of the data 30, by way of example only. The creation of the symmetric key KA may be based on more than one secret $S_B$ (e.g., a secret $S_C$ and a secret $S_D$) in addition to the secret $S_A$. For example, the symmetric key KA may be a function of the secret $S_A$ held by device A, a secret $S_C$ held by a device C and a secret $S_D$ held by a device D. The generation of the symmetric key KA based on more than two secrets is described in more detail with reference to FIGS. 6 and 7. The symmetric key creation system 10 may also be implemented in device B so that device B may create a symmetric key, KB, based on secrets (e.g., secrets $S_A$ and $S_B$ or other secrets) held by device A and device B. Generation of key KB is described in more detail with reference to FIG. 3. It should be noted that a third key, key KC, not known to device A or device B can be used by the tamper resistant security system 26 for its own private needs, e.g., for securing its storage. Key KC may be defined as a function of key KA and key KB, for example, as an XOR (exclusive-or) of key KA and key KB.

Figure 2:
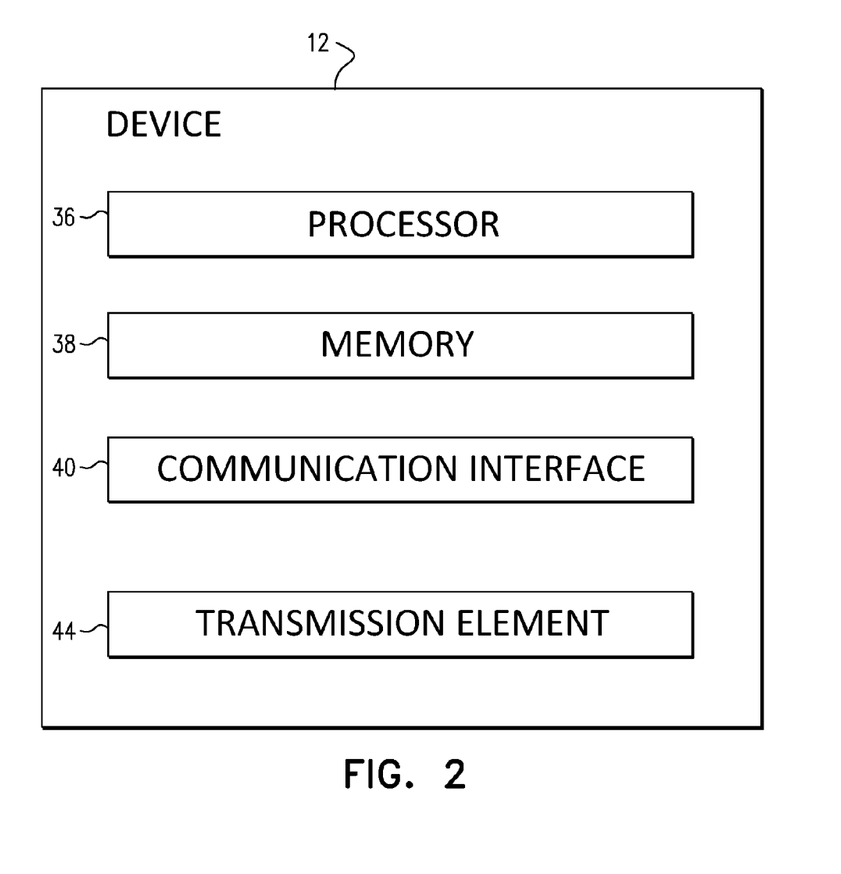
FIG. 2 is a block diagram view of a device in the system of FIG. 1.

Reference is now made to FIG. 2, which is a block diagram view of the device 12 in the system 10 of FIG. 1. The device 12 includes a processor 36 which is typically a hardware processor, a memory 38, a communication interface 40 and a transmission element 44. The processor 36 is operative to generate the secret $S_A$ and perform a symmetric homomorphic encryption of the secret $S_A$ with a cryptographic key H as input yielding a homomorphic encryption result $S_A^*$. The memory 38 is operative to store data used by the processor 36.

The communication interface 40 is operative to send the result $S_A^*$ for mathematical combination by at least one device (e.g., device B which is described in more detail with reference to FIG. 3 or by devices C and D described in more detail with reference to FIGS. 6 and 7) with at least one secret $S_B$ (which may include two secrets, secret $S_C$ and secret $S_D$ both of which are described in more detail with reference to FIGS. 6 and 7) yielding the result G*. It should be noted that device A does not have access to the at least one secret $S_B$ and the at least one device (e.g., device B or devices C and D) does not have access to the secret $S_A$ or to the cryptographic key H. The mathematical combination of the result $S_A^*$ with the at least one secret $S_B$ includes performing at least one modular mathematical operation based on the result $S_A^*$ and the at least one secret $S_B$. The mathematical combination of the result $S_A^*$ and the at least one secret $S_B$ is described in more detail with reference to FIG. 3. The communication interface 40 is operative to receive the result G* from device B when device B is performing the mathematical combination alone or from device C and/or device D when devices C and D are performing the mathematical combination together.

The processor 36 is operative to perform a symmetric homomorphic decryption of data based on the result G* with the cryptographic key H as input yielding a decrypted output. In other words, the result G* may be mathematically combined with other data, for example, by performing a mathematical operation on G* with the other data yielding an output which is input to the symmetric homomorphic decryption operation. Alternatively, the result G* may be directly input to the symmetric homomorphic decryption operation. The processor 36 is operative to determine a symmetric cryptographic key KA based on the decrypted output (which may optionally be mathematically combined with other data) for secure communication with the device 28 (FIG. 1) which is operationally connected to, or includes, the tamper resistant security system 26 (FIG. 1). It should be noted that direct decryption of the result G* may yield the symmetric cryptographic key KA. Alternatively, the result G* may be mathematically combined with other data before being decrypted to yield the symmetric cryptographic key KA. An example of this processing is described in more detail with reference to FIG. 7. Alternatively, the result G* may be mathematically combined with other data before being decrypted to yield a result which is then mathematically combined with other data to yield the symmetric cryptographic key KA. Alternatively, the result G* may be decrypted and then mathematically combined with other data in order to yield the symmetric cryptographic key KA. An example of this processing is also described in more detail with reference to FIG. 7.

The processor 36 is operative to secure data 30 (FIG. 1) using the symmetric cryptographic key KA yielding secured data. The data 30 may be media content, a cryptographic key, key generation data, or any other suitable data, by way of example only. Securing the data 30 may include encrypting the data 30 and/or generating a digital signature or a MAC (message authentication code) of the data 30, by way of example only.

The transmission element 44 is operative to send the secured data 30 to the device 28 (FIG. 1) which is operationally connected to, or includes, the tamper resistant security system 26 (FIG. 1). The transmission element 44 may be implemented as an integral part of the communication interface 40 or as a separate element. The transmission element 44 typically includes transmission and receiving functionality. However, the transmission element 44 may include transmission without receiving functionality, for example, as part of a broadcaster Headend for transmitting encrypted media content to subscriber receiver-decoder devices, by way of example only.

The fundamental property of homomorphic computation is: DecH(F(EncH(S)))=F(S), where EncH(x) and DecH(x) are the homomorphic (non-deterministic, symmetric) encryption and decryption of x, respectively. The symmetric homomorphic encryption and decryption operations described herein may be based on a polynomial or matrix homomorphic encryption/decryption method or any other suitable homomorphic encryption/decryption method. The disclosed embodiments may be implemented using homomorphic encryption/decryption techniques based on polynomial functions, referred to herein as "polynomial homomorphic encryption" or based on matrices. For example, PCT International Publication WO 2014/016795, describes a practical, fully-homomorphic encryption system for specific data in $Z_N$, wherein $Z_N$ is the ring of residues modulo N, and N is factored by two large secret primes, p and q. The system can be used in fully-homomorphic methods for practical symmetric encryption of mod-N data over the ring $Z_N$. The methods disclosed in the above-mentioned PCT publication are said to enable the use of low-cost collaborative security platforms for applications such as keyed-hash or private-key derivation algorithms. It is shown in the publication that random plaintext data is a sufficient condition for proof of security of the homomorphic encryption. Techniques of this sort are described in greater detail in the above-mentioned PCT publication WO 2014/016795, as well as in the Annex below. These techniques enable the processor 36 to encrypt and decrypt values using arithmetic operations, while defining a homomorphic version of the mathematical combination operation that can be applied efficiently to the parameters provided by the encryption. The encryption scheme is provably-secure when applied to plaintext values that have the form of large random numbers. The numbers are "random" in the sense that they are chosen arbitrarily in $Z_N$, and there is no correlation between successive choices, where $Z_N$ is the ring of residues modulo N, and N is factored by two primes, p and q. The description below describes device A homomorphically encrypting a value for device B which then performs modular mathematical operations, modulo N, with the encrypted output and other data. It may be appreciated that the description below may be applied to other devices performing homomorphic encryption and modular mathematical operations including, but not limited to including, homomorphically encrypted values.

Typically, the polynomial homomorphic encryption scheme, as described in the above-mentioned PCT publication and in the Annex, uses a plurality of secret random large numbers, typically two secret random large numbers, as polynomial roots in encrypting plaintext values, and applies the corresponding polynomial in encoding each plaintext value in the form of two output parameters. The actual encoding scheme is explained further hereinbelow. In some embodiments, the device (e.g., device B) or devices (e.g., devices C and D) receiving the two output parameters, also receive additional parameters equal to the sum and product of the roots, and applies the sum and the product in performing the mathematical combination of the homomorphically encrypted secret $S_A$ (i.e., the result $S_A^*$) with the at least one secret $S_B$.

The following description relates to encryption of a single numerical variable v, using a second-order public polynomial PP(v). The computations are typically mod N, wherein N is a public modulus, which may be derived as the product of two secret primes, p and q, N=p·q. Encryption schemes using higher-order polynomials may alternatively be used and are considered to be within the scope of the present disclosure. Further details are presented in the Annex and in the above-mentioned PCT publication. The Annex also describes a matrix based homomorphic method which may be used for homomorphic encryption and/or decryption as described herein.

To encrypt a secret value for exponentiation, device A selects two (mod N) secret, random, large numbers, $v_1$ and $v_2$, and computes the public polynomial:

$$PP(v)=(v-v_1)\cdot(v-v_2) \bmod N = v^2 + b\cdot v + c.$$

A plaintext value $X_i$ can be encrypted using any linear function in the variable v of the form $a_i \cdot v + d_i$, satisfying $a_i \cdot v_1 + d_i = X_i$. The homomorphic encryption of $X_i$, $HE(X_i)$, is defined by the pair of parameters $(a_i, d_i)$. To encrypt $X_i$ in this fashion, device A selects a large-number (mod N) random value $R_i$, sets $a_i = R_i$, and finds $d_i$ by solving the linear equation:

$$R_i \cdot v_1 + d_i = X_i,$$

i.e., $d_i = X_i - R_i \cdot v_1$.

Thus, the ciphertext of $X_i$ is the pair $(a_i, d_i)$. To decrypt an encrypted variable (or a computed function of encrypted variables, as may be returned to device A by device B, for example) that is represented by a pair $(a,d)$, device A computes the linear function $a \cdot v_1 + d$ using the secret root $v_1$. Homomorphic multiplication of encrypted values of the form $HE(X_i) = (a_i, d_i)$ by device B, for example, typically includes device B also receiving from device A and making use of the polynomial coefficients derived above:

$$b = -(v_1 + v_2) \equiv -T_V$$

$$c = v_1 \cdot v_2 \equiv P_V$$

Device B may perform homomorphic multiplication of two encrypted values $HE(X_1)$ and $HE(X_2)$ by computing the following sum of products:

$$HE(X1) \cdot HE(X_2) = ((a_1+d_1) \cdot (a_2+d_2) - a_1 \cdot a_2 \cdot (1+b) - d_1 \cdot d_2,$$

$$(d_1 \cdot d_2 - a_1 \cdot a_2 \cdot c)).$$

Device B may perform homomorphic addition of two encrypted values $HE(X_1)$ and $HE(X_2)$ by computing:

$$HE(X_1) + HE(X_2) = (a_1+a_2, d_1+d_2).$$

Addition and multiplication of a plaintext scalar value y and a homomorphic encrypted value, X*, represented by two values (R,U) is as follows:

$$X^* + y = (R, y+U); \text{ and}$$

$$X^* \cdot y = (y \cdot R, y \cdot U).$$

Device B may evaluate a polynomial function with the result $S_A^*$ as input by performing repeated multiplication operations and addition operations based on the rules described above, using the values $a_i$ and $d_i$, along with other public values, such as $T_V$ and $P_V$, that are provided by device A.

Figure 3:
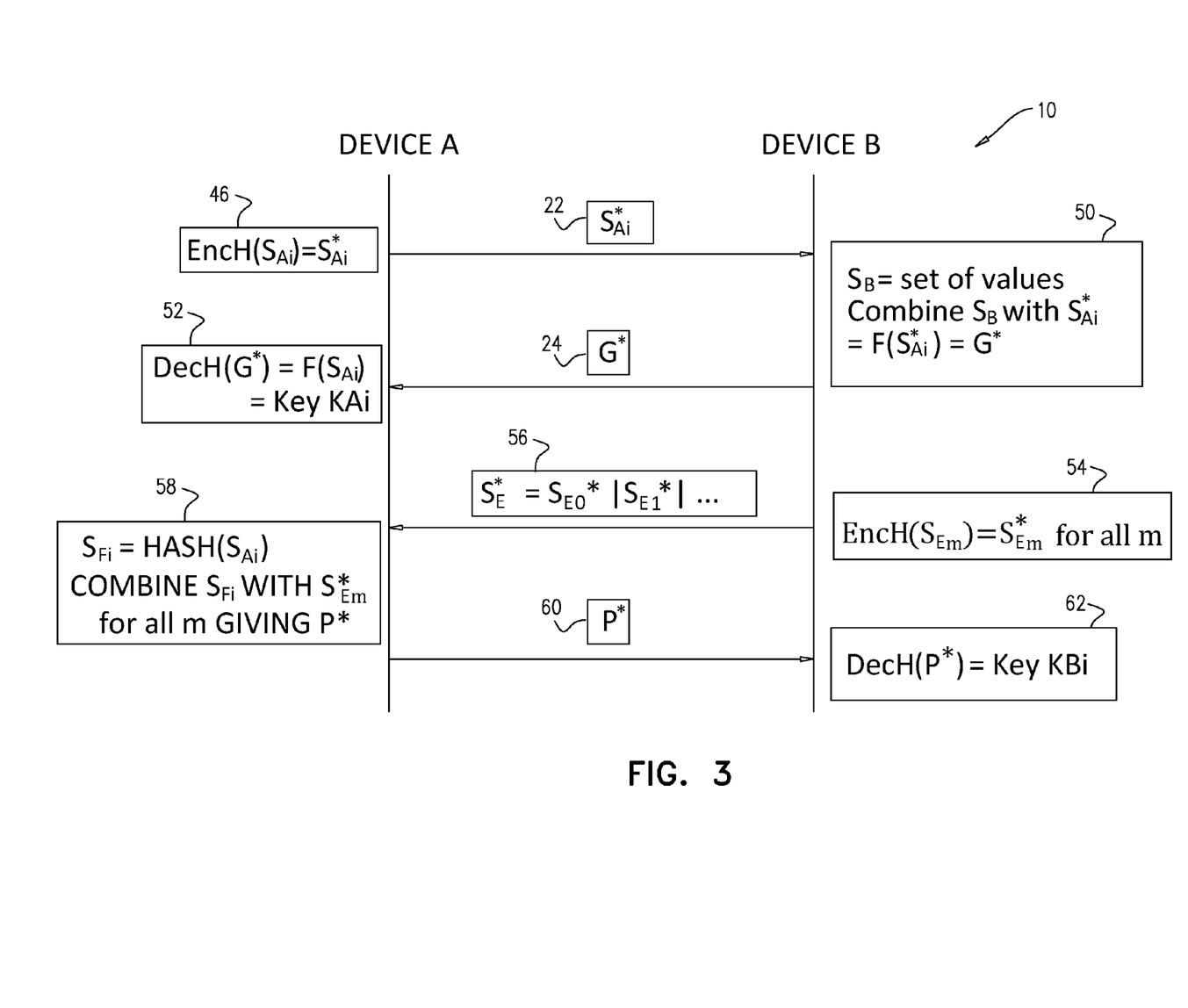
FIG. 3 is a flow diagram of an exemplary mode of operation of the system of FIG. 1.

Reference is now made to FIG. 3, which is a flow diagram of an exemplary mode of operation of the system 10 of FIG. 1. FIG. 3 shows generation of Key KAi for device A and generation of Key KBi for device B for secure communication with a secure client i. It should be noted that $S_A$ is typically unique per secure client i, and may be denoted as $S_{Ai}$. The secret $S_B$ may be unique per secure client i or shared by multiple clients, as will be described in more detail below. The processor 36 (FIG. 2) is operative to generate the secret $S_{Ai}$ (the secret $S_{Ai}$ is typically random number of length R bits, R being greater or equal to 1000) and perform a symmetric homomorphic encryption of the secret $S_{Ai}$ with the cryptographic key H as input yielding the homomorphic encryption result $S_{Ai}^*$ (block 46). The communication interface 40 (FIG. 2) is operative to send the result $S_{Ai}^*$ (block 22) for mathematical combination by device B with secret $S_B$ yielding the result G* (block 50). It should be noted that device A does not have access to the secret $S_B$ and device B do not have access to the secret $S_{Ai}$ or to the cryptographic key H. The mathematical combination of the result $S_{Ai}^*$ with the secret $S_B$ includes homomorphically evaluating the function $F(x)$ with $S_{Ai}^*$ substituted for x (i.e., $F(S_{Ai}^*)$. The function $F(x)$ is typically a polynomial function where homomorphically evaluating the polynomial includes substituting the result $S_{Ai}^*$ for the indeterminate of the polynomial and using the secret $S_B$ for the coefficients of the polynomial. The secret $S_B$ may include a plurality of values $S_{Bm}$, m being an integer index. The values $S_{Bm}$ are used in evaluating the polynomial. For example, 50 $S_{Bm}$ values may provide enough data for $2^{50}$ coefficients of the polynomial. Based on an example where the order of the polynomial F is $2^{50}$, device B may evaluate $F(S_{Ai}^*)$ as follows: (a) compute $x_{in} = S_{Ai}^*$, (b) calculate $x_{out} = (S_{Bm} + x_{in})^2$ mod N; (c) repeat step (b) using the most recently calculated $x_{out}$ as $x_{in}$ and advancing m by 1 and (d) repeat steps (c) and (b) until step (b) has been performed 50 times in total (m runs from 1 to 50 by increments of 1). Performing steps (a) to (d) yields evaluating a polynomial of order $2^{50}$ with 50 values $S_{Bm}$. A polynomial of order $2^{50}$ or more is typically used when key $S_B$ is common to many devices 28 (FIG. 1). The value 50 is a security parameter and can be reasonably modified according to security robustness requirements. Generation of the values $S_{Bm}$ are described in more detail below. It will be appreciated that a polynomial of order 50 is used by way of example only. The polynomial may have an order less than 50 or greater than 50 subject to satisfying security concerns of a particular implementation of the symmetric key creation system 10. However, if $S_A$, $S_B$ and $S'_B$ ($S_B$ and $S'_B$ being secrets of device B) are unique secret large random numbers per secure client, denoted as $S_{Ai}$, $S_{Bi}$ and $S'_{Bi}$ for client i, then $F(S_{Ai}^*)$ may be evaluated as $(S_{Bi} \cdot S_{Ai}^* + S'_{Bi})^2$ mod N. Alternatively, where $S'_{Bi}$ is the hash of $S_{Bi}$, $F(S_{Ai}^*)$ may be evaluated as $(S_{Bi} \cdot S_{Ai}^* + HASH(S_{Bi}))^2$ mod N, where HASH is a cryptographic hash function such as MD5 or SHA-1. Alternatively, $F(S_{Ai}^*)$ may be evaluated as the square mod N of any linear function of $S_{Ai}^*$ whose coefficients are typically two unique secret large random numbers (LRNs) of device B. The resulting $F(S_{Ai}^*)$ is denoted G* (block 24) and is the homomorphic encrypted value of KAi.

Different polynomial functions differ in their coefficient values so there may be a single implementation for the functions using different coefficients to provide different polynomial functions. The following is a non-limiting example for determining the factors $S_{Bm}$. The factors $S_{Bm}$ may be computationally defined from secret parameters $\alpha_i$'s which are presumed dependent on a function-unique secret parameter T, and from public parameters $\beta_i$'s so that each $S_{Bm}$ is equal to $\alpha_m + \beta_m$. Let T be a 128 bit secret key assigned to F and generate Z, a 112 byte value as defined below. $Z = AES-Enc(T,1) \| AES-Enc(T,2) \|, \ldots, \| AES-Enc(T,13)$, where $\|$ denotes concatenation. Where AES-Enc(k,v) denotes performing an encryption using the AES (Advanced Encryption Standard) encryption algorithm with a key k and input v. The generated value Z suffices for 50 $\alpha_m$'s of 4 bytes each taken from different parts of Z, e.g., one $\alpha_m$ is taken from the first four bytes of Z and another $\alpha_m$ is taken from the next four bytes of Z, etc. Note, for $\beta_m$'s in general, and for $\alpha_m$'s that belong to a function whose coefficients are not encrypted (e.g., polynomial F as described with reference to FIG. 3), a four byte value for $\alpha_m$ and $\beta_m$ will suffice; such that any 128 bits generated above can serve four different $\alpha_m$'s.

Evaluating a function with homomorphically encrypted value may be defined as performing certain mathematical operations on the homomorphically encrypted values such that the result(s) of the evaluated function can be homomorphically decrypted to yield a result that would have been calculated if the same function was evaluated with non-encrypted values. The communication interface 40 is operative to receive the result G* (block 24) from the device B. The processor 36 is operative to perform a symmetric homomorphic decryption of data based on the result G* with the cryptographic key H as input yielding a decrypted output. The processor 36 is operative to determine a symmetric cryptographic key KAi based on the decrypted output (block 52).

The generation of the key KBi is now described below. Device B has a secret $S_E$ related to a polynomial function W. The key KB is calculated as $W(S_{Fi})$ where $S_{Fi}$ is a secret held by device A. The secret $S_E$ may include a plurality of large random values where the $m^{th}$ value is $S_{Em}$ such that the values $S_{Em}$, m running from 1 to 50, include information for generating the coefficients of the polynomial W. The symmetric homomorphic encryption by device B, of the values of its secret $S_E$, includes performing symmetric homomorphic encryption of each of the values $S_{Em}$ with a cryptographic key Y as input yielding a plurality of homomorphic encryption results $S_{Em}^*$ (block 54). The communication interface 40 (FIG. 2) of device A is operative to receive the result $S_E^*$ made up of the individual encryption results $S_{Em}^*$ (block 56). The device A does not have access to the secret $S_E$. The processor 36 (FIG. 2) of device A is operative to perform a mathematical combination of the result $S_E^*$ with the secret $S_F$ (block 58) yielding a result P* (block 60). The mathematical combination of the result $S_E^*$ with the secret $S_F$ typically includes homomorphically evaluating a polynomial of order n, including substituting the secret $S_F$ for the indeterminate of the polynomial and using the results $S_{Em}^*$ for the coefficients of the polynomial yielding the value P* which typically includes a pair of values. The evaluation of the polynomial is typically based on homomorphic addition and homomorphic multiplication operations described above with reference to FIG. 2. Based on an example where the order of the polynomial W is $2^{50}$, device A may evaluate P* as follows: (a) compute $x_{in}=S_{Fi}$, (b) calculate $x_{out}=(S_{Em}^*+x_{in})^2$ mod N; (c) repeat step (b) using the most recently calculated $x_{out}$ as $x_{in}$ and advancing m by 1 and (d) repeat steps (c) and (b) until step (b) has been performed 50 times in total. Since m runs from 1 to 50, performing steps (a) to (d) yields evaluating a polynomial of order $2^{50}$ with 50 values $S_{Em}^*$. Generation of the values $S_{Ei}$ is described in more detail below. The factors $S_{Ei}$ may be computed as follows. Let U be a 128 bit secret key assigned to W and $S_{Ei}$=AES–Enc(U,1i)‖AES–Enc(U,2i+1)‖, . . . ,‖AES–Enc(U,8i+7), thereby generating an $S_{Ei}$ of 1024 bits. It will be appreciated that a polynomial of order 50 is used by way of example only. The polynomial may have an order less than 50 or greater than 50 subject to satisfying security concerns of a particular implementation of the symmetric key creation system 10.

If the secret $S_B$ (e.g., $S_{Bi}$) is used by one client device, client i, and other client devices do not use secret $S_{Bi}$, then $S_E$ may be determined as the hash of $S_B$ or the hash of $S_B$ and another value such as the time of day by device B. In such circumstances, the polynomial may be of order 2 or more and the polynomial may be evaluated by device A as $(S'_{Fi}+S_{Fi}\cdot S_{Ei}^*)^2$ mod N where $S'_{Fi}$ is another large random number secret of device A or the polynomial may be evaluated by device A as $(HASH(S_{Fi})+S_{Fi}\cdot S_{Ei}^*)^2$ mod N.

For security considerations the secret $S_{Fi}$ used for creating KBi is typically different from the secret $S_{Ai}$ used for creating KAi; the secret $S_{Fi}$ may be based on a hash of the secret $S_{Ai}$. In any case, device B does not have access to the secret $S_{Fi}$. The communication interface 40 of device A is operative to send the result P* (block 60) to device B for symmetric homomorphic decryption yielding an output which is used to determine a symmetric cryptographic key KBi (block 62). It will be appreciated that the system 10 may perform the processing to determine key KAi, key KBi or both key KAi and key KBi.

The inputs and outputs of the polynomial functions F and W and the plaintext inputs for encryption, e.g., the secret $S_{Ai}$, are typically LRN. In one embodiment a large number may be defined as a number greater than, or equal to, 1000 bits, typically 1024 bits or more. The evaluations of the polynomials F and W* and the encryption of the secrets $S_{Ai}$ and $S_E$ (or $S_{Ei}$) are typically performed mod N. N is a number greater than, or equal to, 1000 bits, typically 1024 bits or more.

The secret $S_{Ai}$ may be based on a random secret of length Q bits, Q being less than R (R being greater than, or equal to, 1000, typically 1024 or more). Device A is operative to expand the length of the secret $S_{Ai}$ from Q bits to R bits. When the result G* is decrypted, a length of the decrypted output may be compressed from R bits to Q bits. Similarly, it may be convenient for the output of function F whose order is very large, effectively $2^{50}$, to be defined by coefficients of 2 bytes each. Further, the set of 50 or so coefficients may be derived from a 128 bits AES key as described above. Given that the input for the function is an encrypted LRN and the decrypted output is also a LRN which is a cipher key, the input is typically compressed if the cipher used has a smaller key size, for example, but not limited to, 128 bit AES. Therefore, expansion and compression functions may be employed to the input and output of F, respectively. Secret generation, expansion, compression and polynomial generation are discussed in more detail below.

Device A's secrets $S_{Ai}$ are typically randomly generated and associated with a unique public ID (identification). The secret $S_{Ai}$ and its homomorphic encryption parameters may be securely stored e.g., encrypted with device A's RSA public key. Note that for security reasons two different homomorphic encryptions of $S_{Ai}$ are generally not allowed. A single homomorphic encryption of $S_{Ai}$ is assured if the same homomorphic symmetric-encryption key and random values are used when encrypting $S_{Ai}$. Alternatively, $S_{Ai}$ and its encryption key H may be derived from a unique public ID by a function such as keyed hash, e.g., AES where the key is $S_{Ai}$ and the data is its public ID.

Expansion may be performed by an expansion function that may accept a fixed size random input, and outputs a large random number, e.g., 1024 bits. The following two examples may be used assuming a 128 bit secret S is to be expanded to 1024 bits. In the first example, AES is used to calculate AES(k, S+r) eight times with different values of r, where k is a secret key, and r runs from 0 to 7 to give eight 128 bit values concatenated to yield a 1024 bit result. In the second example, a Hash function, for example SHA1 or SHA2, uses inputs S and S+1 to each generate two 512 bit outputs which are concatenated to give 1024 bits string. Compression from 1024 bit value to 128 bits may be performed by selecting the 128 least significant bits.

For security reasons if a given value is homomorphically encrypted more than once, it typically does not use the same homomorphic encryption key and parameters each time the value is encrypted. Similarly, for security reasons each secret value is typically homomorphically encrypted with a unique encryption key and parameters. Finally, the polynomial function F which is of a large order, e.g. $2^{50}$, whose input is an encrypted secret value, and the polynomial function, of similar order, whose encrypted coefficients are used to compute a plaintext input, for security reasons are typically different. When the order of the polynomials is small, e.g., 2, then secrets defining the polynomials and the input for security reasons are typically different for each request for computation.

Figure 4:
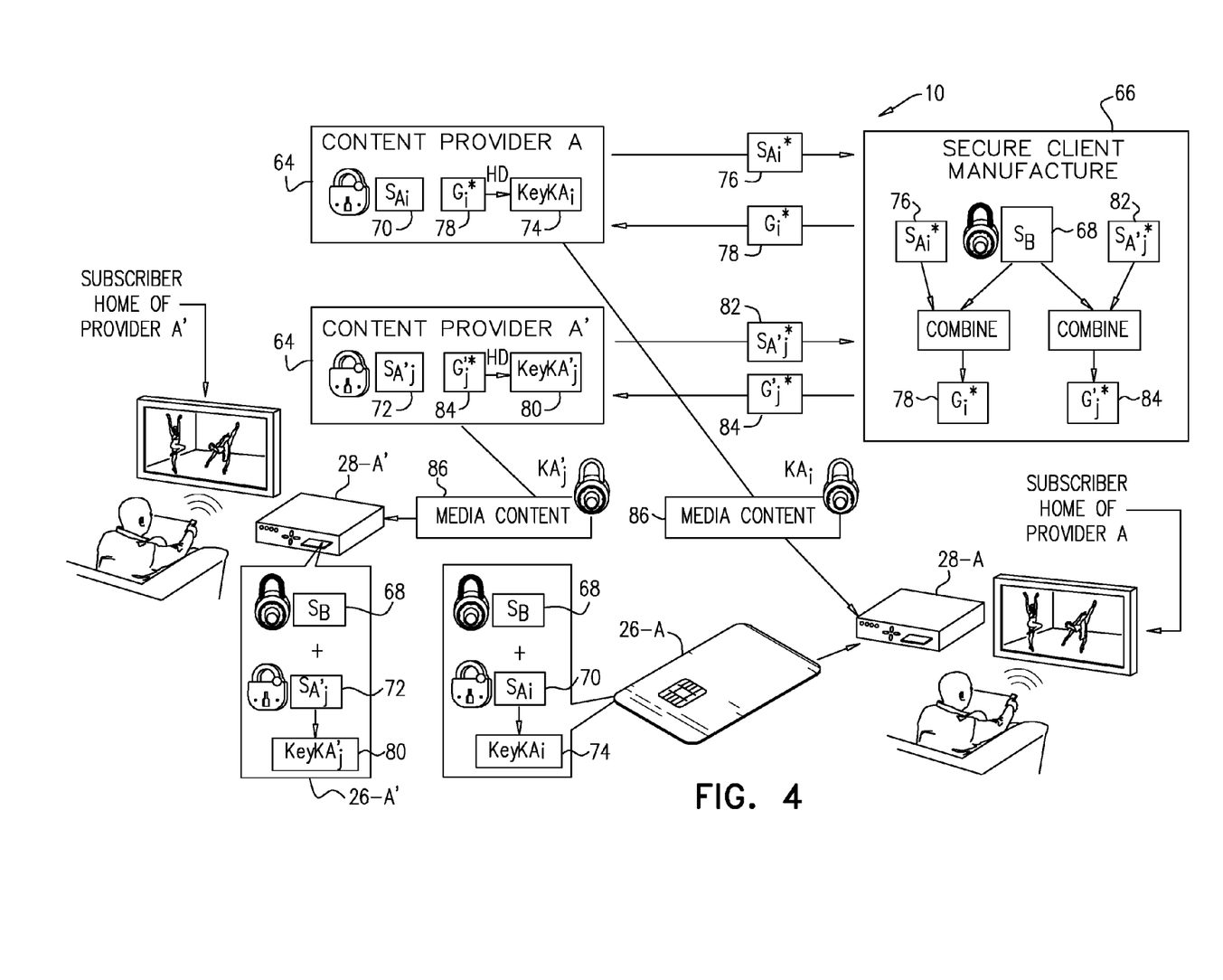
FIG. 4 is a partly pictorial, partly block diagram view of a content provider implementation of the system of FIG. 1.

Reference is now made to FIG. 4, which is a partly pictorial, partly block diagram view of a content provider implementation of the system 10 of FIG. 1. The symmetric key creation system 10 may be implemented in the Pay for content (e.g., pay TV) market where different media content provider back office devices 64, one for content provider A and one for content provider A' (each analogous to a different device A of FIG. 1) each having its own number of distinct secure clients (for example, a tamper resistant security system 26-A of a device 28-A for content provider A and a tamper resistant security system 26-A' of a device 28-A' for content provider A'). Each content provider back-office device 64 is operative to determine its unique symmetric key for each of its secure clients based on the unique secret per secure client, and a secret held by a secure client manufacturer (SCM) 66 (analogous to device B of FIG. 1). The secure client manufacturer 66 holds a secret $S_B$ (block 68) (which defines part of the secret function F) which is embedded in, and common to, many or all the secure clients of both content providers A and A'. The back-office device 64 of content provider A holds a secret $S_{Ai}$ (block 70) that is also installed in its $i^{th}$ secure client 26-A and the back-office device 64 content provider A' holds a secret $S_{A'j}$ (block 72) that is installed in its $j^{th}$ secure client. The back-office device 64 of content provider A calculates a symmetric key $KA_i$ (block 74) for its $i^{th}$ secure client 26-A based on sending $S_{Ai}^*$ (which is $S_{Ai}$ homomorphically encrypted) (block 76) to the SCM 66 for mathematical combination with $S_B$ and receives $G_i^*$ (block 78) in return which is decrypted to yield key $KA_i$. The back-office device 64 of content provider A' calculates a symmetric key KA'j (block 80) for its $j^{th}$ secure client 26-A' based on sending $S_{A'j}^*$ (which is $S_{A'j}$ homomorphically encrypted) (block 82) to the SCM 66 for mathematical combination with $S_B$ and receives $G'_j^*$ (block 84) in return which is decrypted to yield key $KA'_j$. The secrets $S_{Ai}$ and $S_{A'j}$ are typically securely installed in the tamper resistant secure clients 26-A and 26-A' respectively by the content providers A and A'. The secret $S_B$ is typically securely installed in the tamper resistant secure clients 26-A and 26-A' by the SCM 66. The tamper resistant secure clients 26-A and 26-A' may be for example, but not limited to, a smart card. A tamper resistant security system 26-A of a device 28-A may generate the symmetric key $KA_i$ (block 74) based on the embedded secrets, $S_B$ and $S_{Ai}$. Similarly, a tamper resistant secure client 26-A' of a device 28-A' may generate the symmetric key $KA'_j$ (block 80) based on the embedded secrets, $S_B$ and $S_{A'j}$. The processor 36 (FIG. 2) of the back-office device 64 of content provider A is operative to encrypt media content using the symmetric cryptographic key $KA_i$ yielding encrypted media content 86. The transmission element 44 (FIG. 2) of the back-office device 64 of content provider A is operative to send the secured media content 86 to the device 28-A, e.g., a set-top box, which is operationally connected to, or includes, the tamper resistant security system 26-A. The back-office device 64 of content provider A' may similarly encrypt media content yielding encrypted media content 86 using the symmetric cryptographic key $KA'_j$ for sending to the device 28-A'.

Figure 5:
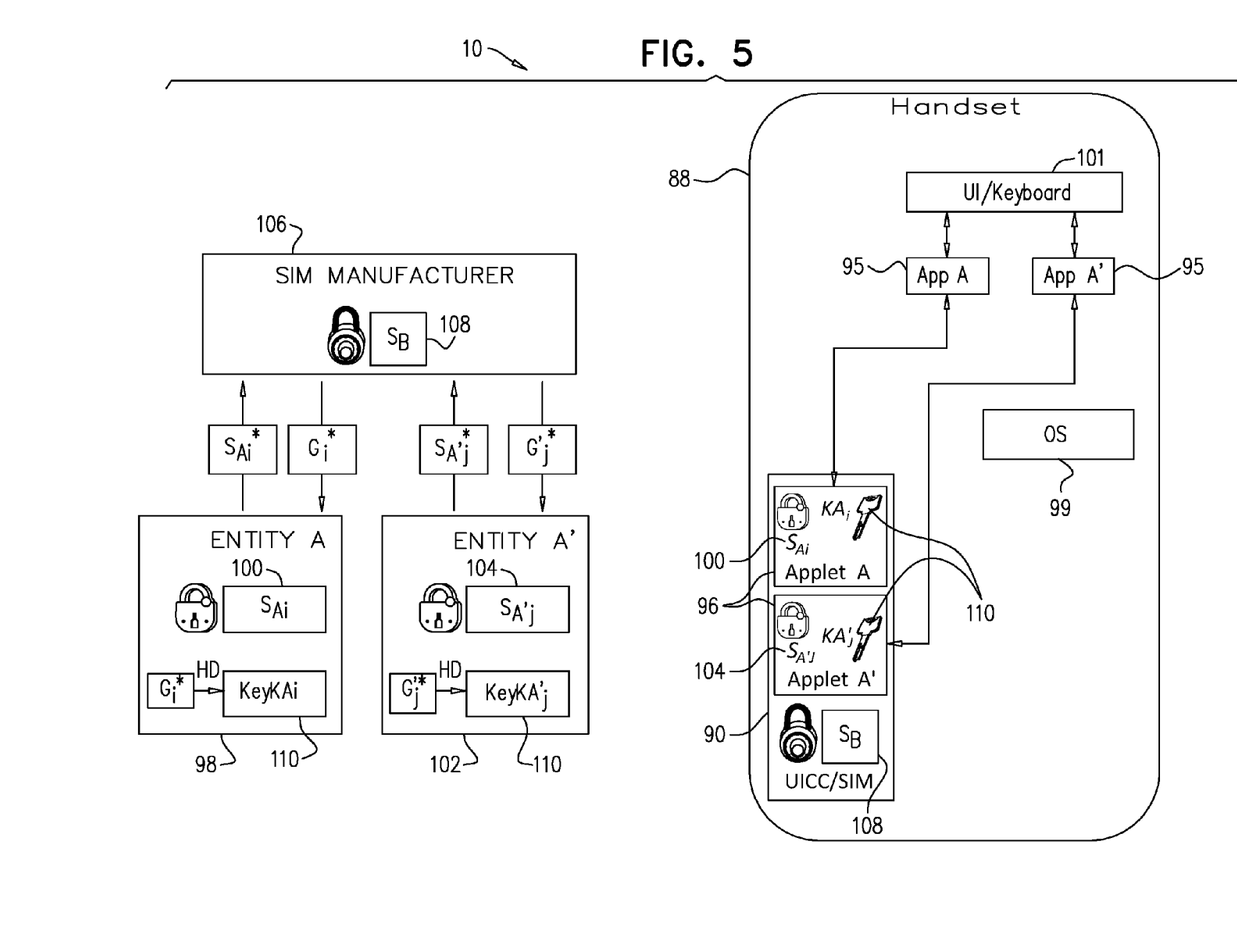
FIG. 5 is partly pictorial, partly block diagram view of a mobile device implementation of the system of FIG. 1.

Reference is now made to FIG. 5, which is partly pictorial, partly block diagram view of a mobile device implementation of the system 10 of FIG. 1. The symmetric key creation system 10 may be implemented in a mobile device environment. Consider a smartphone 88 or other mobile device (analogous to the device 28 of FIG. 1) that is operationally connected to a secure SIM (90) and/or a secure micro SD (secure digital) and/or an embedded SE (secure element) (analogous to the tamper resistant security system 26A of FIG. 1) that holds multiple security-applets 96. Each secure Applet 96 is typically controlled by a different entity (applet vendor), entity A and entity A' (each analogous to a different device A of FIG. 1). Applet A is associated with an entity A (block 98) and is the $i^{th}$ applet of entity A. Applet A is also associated with a secret $S_{Ai}$ (block 100). Applet A' is associated with an entity A' (block 102) and is the $j^{th}$ applet of entity A'. Applet A' is also associated with a secret $S_{A'j}$ (block 104). For example, Applet A is for a bank application and Applet A' is for DRM (digital rights management) for content. The applets 96 are typically separated by a firewall to prevent leakage from one application to another. Each applet's 96 secure execution within the SIM (block 90) (or the secure micro SD or the embedded SE) generates its own secret, e.g. $S_{Ai}$ and $S_{A'j}$, for Applet A and Applet A', respectively. The applets 96 are associated with an application 95, e.g., app A and app A' for Applet A and Applet A', respectively. The hardware of the SIM 90 (or the secure micro SD or the embedded SE) has an embedded circuit (not shown) where a chip/SIM manufacturer 106 (analogous to device B being implemented in the system of the chip/SIM manufacturer 106) implemented its secret function $S_B$ (=F) (block 108). Thus each applet 96 can generate its own key 110, e.g. $F(S_{Ai})$ and $F(S_{A'j})$, for Applet A and Applet A', respectively. Each applet may generate its secret, e.g., $S_{Ai}$, by running some obfuscated code within the SIM 90. Applications A and A' (blocks 95) running in non-secure space of the smartphone 88 rely on their respective applets to do secure communication with external entities such as backend Entity A and A' (blocks 98 and 102), respectively. FIG. 5 also shows other elements of the smartphone 88 such as an operating system (OS) 99 and a UI/keyboard 101. The chip/SIM manufacturer 106 runs a back office protocol with each applet vendor 98, 100 without revealing its secret F to generate the keys 110. The keys may change periodically by updating the Applet software, e.g., $S_{Ai}$. Note that F may also be updated by the chip manufacturer 106 as it is defined via a key which could be updatable. Similarly, an Applet A may generate its own private key based on its secret and the secret of one or more other applets, e.g., Applet B, within the secure client, and report the private key securely to the managing device of Applet A, namely device A via device A's public key.

Figure 6:
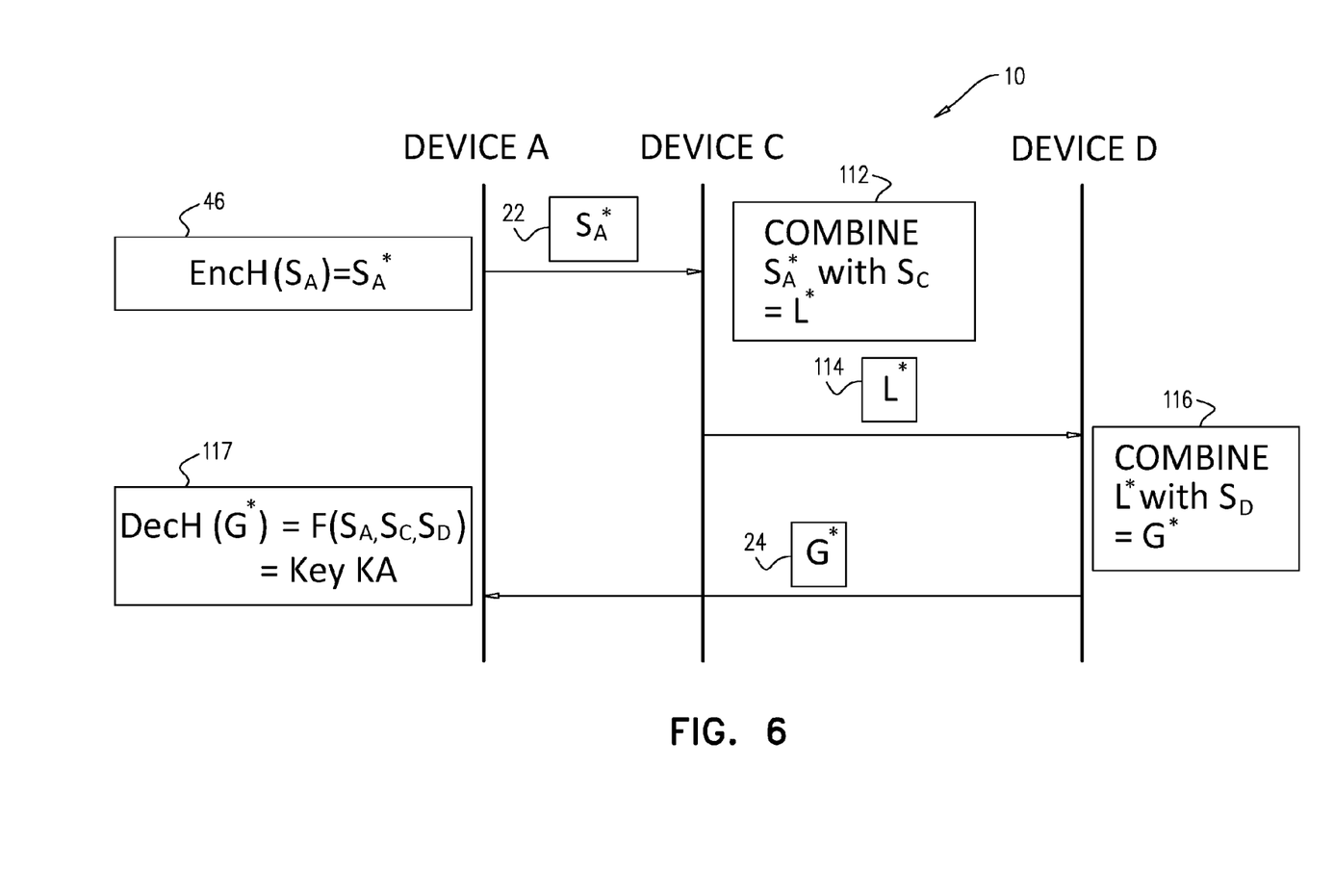
FIG. 6 is a flow diagram of a three device exemplary mode of operation of the system of FIG. 1.

Reference is now made to FIG. 6, which is a flow diagram of a three device exemplary mode of operation of the system 10 of FIG. 1. FIG. 6 shows a device C and D (instead of device B of FIG. 1) and a secret $S_C$ and $S_D$ (instead of a secret $S_B$ of FIG. 1). Processing passes from device A to device C and from device C to device D and back to device A is a serial fashion. The secret SA is homomorphically encrypted yielding $S_A^*$ (block 46). The mathematical combination of the result $S_A^*$ with the secret $S_B$ as described in FIG. 1 is replaced in FIG. 6 by: (a) device C mathematically combining the result $S_A^*$ (block 22) with the secret $S_C$ (block 112) yielding a result $L^*$ (block 114) which is sent to device D by device C; and (b) the device D mathematically combining the result $L^*$ (block 114) with the secret $S_D$ (block 116) yielding the result $G^*$ (block 24). The result $G^*$ is then processed according to the different options described above with reference to FIG. 2 yielding the key KA (block 117).

Figure 7:
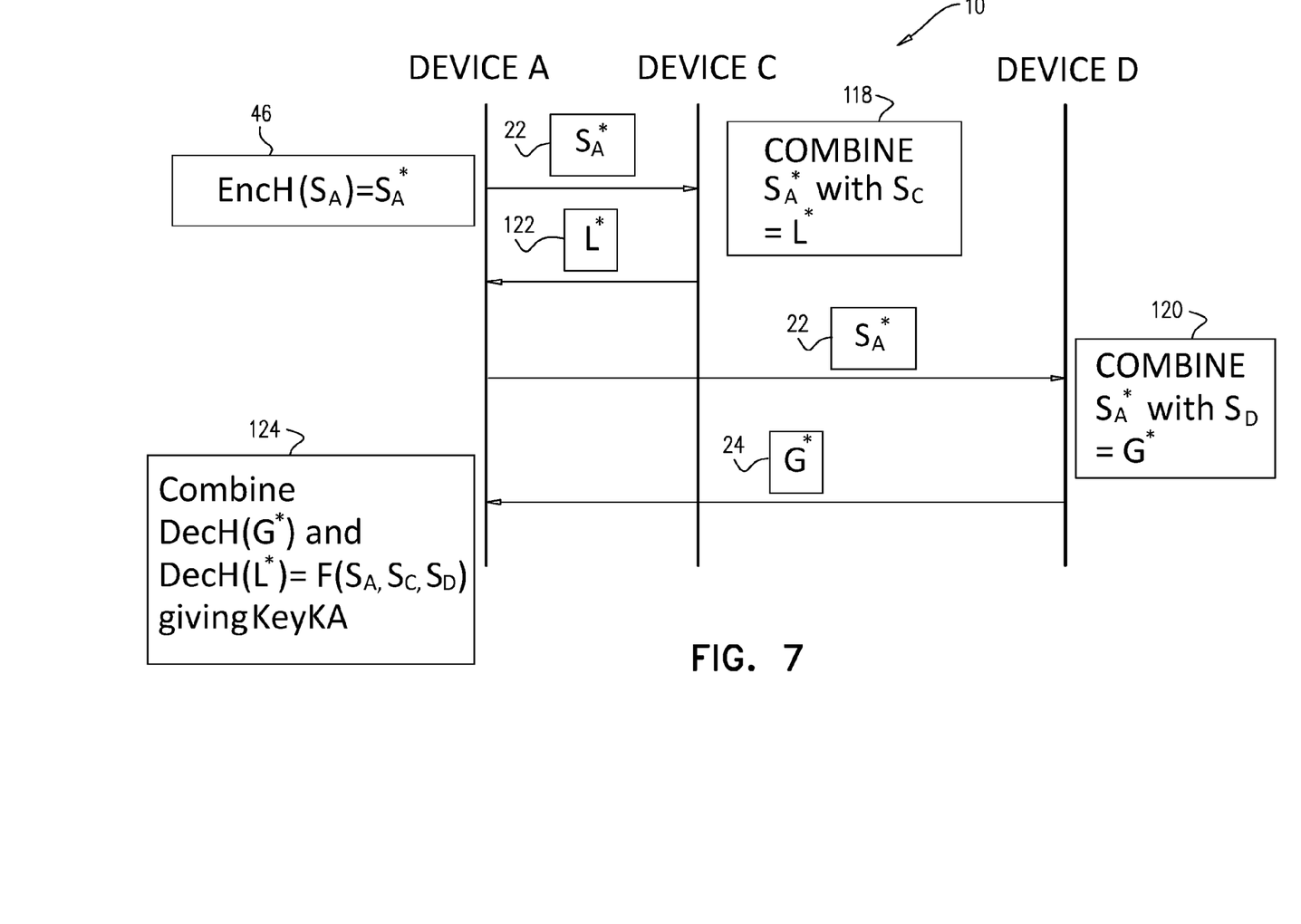
FIG. 7 is a flow diagram of another three device exemplary mode of operation of the system of FIG. 1.

Reference is now made to FIG. 7, which is a flow diagram of another three device exemplary mode of operation of the system 10 of FIG. 1. FIG. 7 shows a device C and D (instead of device B of FIG. 1) and a secret $S_C$ and $S_D$ (instead of the secret $S_B$ of FIG. 1). In FIG. 7, device A generates (block 46) the result $S_A^*$ (block 22) which is sent to both device C and device D for combing with the secret $S_C$ and secret $S_D$, respectively, as is now be described in more detail. The mathematical combination of the result $S_A^*$ with the secret $S_B$ as described in FIG. 1, is replaced by the following in FIG. 7: (a) the device C mathematically combines the result $S_A^*$ with the secret $S_C$ (block 118) yielding a result $L^*$ (block 122); and (b) the device D mathematically combines the result $S_A^*$ with the secret $S_D$ (block 120) yielding the result $G^*$ (block 24). The communication interface 40 (FIG. 2) is operative to receive the result $L^*$ (block 122) and the result $G^*$ (block 24) from device C and device D, respectively. The processor 36 (FIG. 2) is operative to perform a symmetric homomorphic decryption of data based on the result $L^*$ as input yielding a decrypted output (based on $L^*$, e.g., $DecH(L^*)$) and a symmetric homomorphic decryption of data based on the result $G^*$ as input yielding a decrypted output (based on $G^*$, e.g., $DecH(G^*)$). In other words, the result $G^*$ and/or $L^*$ may be mathematically combined with other data, for example, by performing a mathematical operation on G* and/or L* with the other data yielding an output(s) which is/are input to the symmetric homomorphic decryption operation(s). Alternatively, the result G* and/or L* may be directly input to the symmetric homomorphic decryption operation(s). The processor 36 is operative to determine the symmetric cryptographic key KA based on mathematically combining the decrypted outputs (based on G* and L*) and optionally other data (block 124) using any suitable addition and/or multiplication operation, by way of example only.

Instead of performing the operations described in block 124, the processor 36 (FIG. 2) may be operative to mathematically combine the result L* (block 122) with the result G* (block 24) and optionally other data yielding a result M* and perform a symmetric homomorphic decryption of the result M* (which is based on L* and G*) with the cryptographic key H as input yielding a decrypted output which is used as a basis (optionally by mathematically combining with other data) for determining the symmetric cryptographic key KA.

Figure 8:
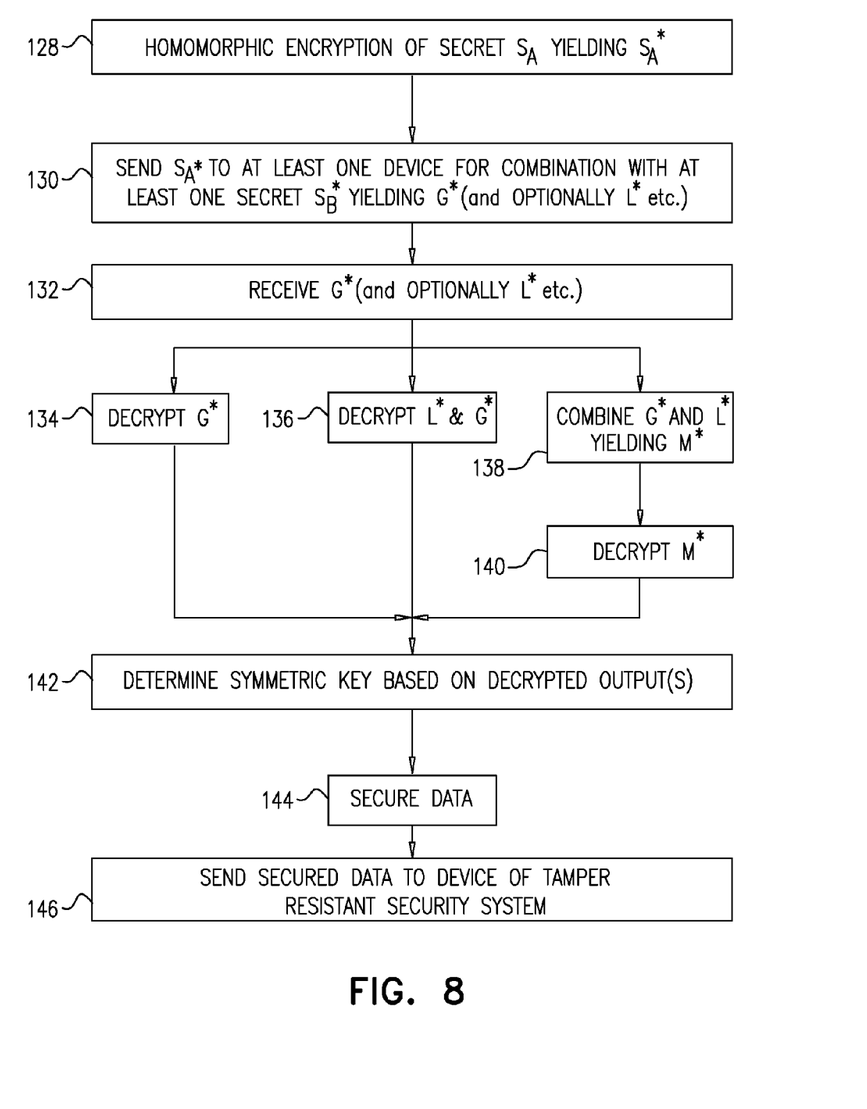
FIG. 8 is a flow chart of showing exemplary steps in a method of operation of the system of FIG. 1.

Reference is now made to FIG. 8, which is a flow chart of showing exemplary steps in a method of operation of the system 10 of FIG. 1. The processor 36 (FIG. 2) in device A is operative to perform a symmetric homomorphic encryption of secret $S_A$ with cryptographic key H as input yielding homomorphic encryption result $S_A^*$ (block 128). The communication interface 40 (FIG. 2) in device A is operative to send the result $S_A^*$ for mathematical combination by at least one device with at least one secret $S_B$ yielding a result G* (block 130). The communication interface 40 is operative to receive the result G* (and optionally the result L* as described with reference to the exemplary mode of operation of FIG. 7) (block 132). The processor 36 is operative to perform a symmetric homomorphic decryption of data based on the result G* with the cryptographic key H as input yielding a first decrypted output (block 134). Alternatively, the processor 36 is operative to perform a symmetric homomorphic decryption of data based on the result G* and a symmetric homomorphic decryption of data based on the result L* yielding a first and second decrypted output, respectively (block 136) as described above with reference to FIG. 7. Alternatively, the processor 36 is operative to mathematically combine the results G* and L* yielding the result M* (block 138) and perform a symmetric homomorphic decryption of data based on the result M* with the cryptographic key H as input yielding a first decrypted output (block 140). The processor 36 is operative to determine a symmetric cryptographic key KA based on the first decrypted output (and the second decrypted output, if calculated) (block 142). The processor 36 (FIG. 2) is operative to secure data using the symmetric cryptographic key KA yielding secured data (block 144). The transmission element 44 (FIG. 2) is operative to send the secured data to the device 28 (FIG. 1) which is operationally connected to, or includes, the tamper resistant security system 26 (FIG. 1) (block 146).

It will be appreciated that the symmetric key creation system 10 may be implemented by creating key KAi via a protocol using homomorphic encryption between each client device i holding secret $S_{Ai}$ and another party holding secret $S_B$. or $S_{Bi}$. The managing party may then generate key KAi based on mathematically combining secret $S_{Ai}$ and secret $S_B$. or $S_{Bi}$ embedded therein.

In practice, some or all of these functions of the symmetric key creation system 10 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory. It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination. It will be appreciated by persons skilled in the art that the present disclosure is not limited by what has been particularly shown and described hereinabove. Rather the scope of the disclosure is defined by the appended claims and equivalents thereof.

ANNEX

The Methods: Practical FSERFS Simplified (Single Input)

Each of the isomorphic methods presented is an efficient non-deterministic Fully-homomorphic Symmetric Encryption and Randomization Function (FSERF). The input or message, IN, is comprised of k elements in a commutative ring (CR) or in ring $Z_N$. Randomization is defined over a general commutative ring (CR), e.g., $F_{256}$, R (real numbers), or sub ring of commutative matrices. Encryption is defined over the ring $Z_N$ (the operations are typically mod N, where N is a product of two (large secret) primes). The non-deterministic method operates on an input and a random parameter (in $Z_N$ or CR); the random parameter typically changes per each execution of the method. For encryption both the plaintext input and the random parameter associated with it are random large-numbers in $Z_N$.

Two fundamental isomorphic methods are defined below; each randomizes or encrypts a single input element $X_i$. The basic (isomorphic) methods are a matrix-based method, MORE (Matrix Operation for Randomization or Encryption), and a polynomial-based method, PORE (Polynomial Operation for Randomization or Encryption). Additionally, 'compound' methods can be constructed by successively applying the basic methods.

The Matrix Method, More

Symmetric-Key Generation: Alice's device randomly selects a secret 2×2 invertible matrix, S, in $Z_N$ to be the symmetric key for encryption.

Encryption: For each plaintext input element $X_i$ Alice's device selects a random large-number $Y_i$, in $Z_N$. $X_i$ and $Y_i$ are placed in order on the diagonal of a 2×2 diagonal matrix. We denote MORE's output matrix as Ai and define the encryption of $X_i$ as:

$$\text{MORE}(X_i) = A_i = S\begin{pmatrix} X_i & 0 \\ 0 & Y_i \end{pmatrix} S^{-1} = \begin{pmatrix} a_{11} & a_{12} \\ a_{21} & a_{22} \end{pmatrix}$$

The cipher text of $X_i$ can be regarded as the four values given in matrix Ai. However an alternative economical representation is possible. For a given S, MORE's matrix space is defined by two large numbers, and the cipher text of a Xi is defined by any pair of large numbers in $A_i$ except for $a_{12}, a_{21}$.

Decryption: One who knows S can decrypt the cipher text matrix A and recover a plaintext X. S and $S^{-1}$ are eliminated by simple matrix multiplication, $X=(S^{-1}AS)_{11}$.

Alternatively, let the vector (1, e) be an eigenvector of the matrix $$A = S\begin{pmatrix} X & 0 \\ 0 & Y \end{pmatrix} S^{-1}$$

satisfying: (1, e)A=(X, e·X).
The decryption of A is defined as follows:
$X=a_{11}+e·a_{21}$ (Mod N) where $e=(-S_{12}/S_{22})$ mod N, and $S_{ij}$, $a_{ij}$ a are the ij elements of matrices S and A, respectively.

Computation of Multivariate Function of Encrypted Values

We define below the operations of addition, multiplication and division of encrypted values. We let A1 and A2 be the encrypted values of $X_1$ and $X_2$, respectively. The Ai's comprise the input of a function in which they are added, multiplied, or divided. We thus have for:
Addition, MORE $(X_1)$+MORE $(X_2)=A_1+A_2$; and
Multiplication, MORE $(X_1)$·MORE $(X_2)=A_1·A_2$; and
Division (for Det MORE$(X2)\neq 0$)
1/MORE $(X_2)=A_2^{-1}$ and MORE $(X_1)$/MORE $(X_2)=A_1·A_2^{-1}$; It can be easily shown that under the above definitions MORE is fully homomorphic.

The Polynomial Method, Pore

Again, the simplest yet useful case to consider is a single variable encryption with the minimum degree of the public polynomial.

Symmetric-Key Generation: Alice's device selects two (mod N) secret random large-numbers, $v_1$ and $v_2$, for the symmetric-key. Alice's device computes the public polynomial $PP(v)=(v-v_1)·(v-v_2)$ mod $N=v^2+b·v+c$.

Encryption: Encryption of plain text $X_i$, Enc (Xi), is any linear function in variable v of the form $a_i·v+d_i$ satisfying $a_i·v_1+d_i=X_i$. Let the pair $(a_i, d_i)$ define Enc (Xi). Alice's device selects a large-number mod N random $R_i$, for $a_i$ and solves the linear equation $R_i·v_1+d_i=X_i$ for $d_i$; thus $d_i=X_i-R_i·v_1$. The cipher text of Xi, consists of the pair $(a_i, d_i)$. Alternatively, Alice's device can pick a random large-number mod N, $R_i$, for the given $X_i$ and solve the simultaneous equations below for the unknowns $a_i$ and $d_i$:

$a_i·v_1+d_i=X_i$, and     a.

$a_i·v_2+d_i=R_i$     b.

resulting in: $a_i=(X_i-R_i)/(v1-v2)$, and $d_i=X_i-a_i·v_1=(R_i·v_1-X_i·v_2)/(v_1-v_2)$. This alternative, (computationally heavier), is useful in certain applications of verification.

Decryption: Given that an encrypted variable, (or a computed function of encrypted variables) is represented by a pair (a,d), anyone who knows the secret roots can decrypt by simply computing $a·v_1+d$.

Computation of multivariate function: For Bob's device to compute a function with the encrypted Xi, the public coefficients, b and c, (defined above under key generation) are used; note that b and c do not change for encryption of different variables; they are given typically once (per some predefined period) by Alice's device to Bob's device. We also note that typically one large-number multiplication is used for encryption. When computing multivariate functions with the encrypted variables we consider the addition, multiplication and division of two variables. Addition and multiplication of encrypted values are defined by the addition and multiplication, respectively, of the corresponding linear functions in $Z_N[v]/PP(v)$. Given $PORE(X_1)=(a_1, d_1)$, $PORE(X_2)=(a_2, d_2)$ and $PP(v)=v^2+bv+c$, addition, multiplication and division are performed as below.

Addition: $PORE(X_1)+PORE(X_2)=(a_1+a_2, d_1+d_2)$.
Adding a scalar S to $PORE(X_1)$: $S+PORE(X_1)=(a_1, d_1+S)$.
Multiplication: $PORE(X_1)·PORE(X_2)=((a_1+d_1)·(a_2+d_2)-a_1·a_2·(1+b)-d_1·d_2, (d_1·d_2-a_1·a_2·c))$. This particular form aims at minimizing the number of multiplications of large numbers, i.e. five. Note, for squaring a variable, use above with $X_1=X_2$ and $(a_1=a_2, d_1=d_2)$. Multiplying $PORE(X_1)$ by a scalar S: $S·PORE(X_1)=(S·a_1, S·d_1)$
Division: Let $D=d_2·(a_2·b-d_2)-(c·a_2)·a_2$, $PORE(X_1)/PORE(X_2)=((a_2·d_1-a_1·d_2)/D, (d_1·(a_2·b-d_2)-(c·a_2)·a_1)/D)$. It can be shown easily that, under the above definitions, the PORE scheme is fully homomorphic.

More and Pore are Isomorphic

Given the above definitions of MORE and PORE where operations under MORE are over the commutative ring $C1=\{SMS^{-1}|M$ a diagonal matrix comprised of X and Y$\}$, and operations under PORE are in the commutative ring $C2=Z_N[v]$ mod $PP(v)$, it can be shown that: 1. The mapping T: C1→C2 defined by $T(SMS^{-1})=av+d$ where $av_1+d=X$ and $av_2+d=Y$ is an isomorphism; and 2. For a given element in C1 finding its isomorphic image by someone who knows PP(v) is as difficult as factoring N.

What is claimed is:
1. A method, comprising:
performing, by a processor in a device A, a symmetric homomorphic encryption of a secret $S_A$ with a cryptographic key H as input yielding a homomorphic encryption result $S_A^*$;
sending, on a communication interface in the device A, the result $S_A^*$ for mathematical combinations by at least one device with at least one secret $S_B$ yielding a result G*, the device A not having access to the at least one secret $S_B$, the at least one device not having access to the secret $S_A$ and not having access to the cryptographic key H, in order to provide distributed security and avoid a single point of compromise;
receiving, on the communication interface, the result G*;
performing, by the processor, a symmetric homomorphic decryption of data based on the result G* with the cryptographic key H as input yielding a first decrypted output;

determining a symmetric cryptographic key KA based on the first decrypted output, the symmetric cryptographic key KA being for secure communication with a first device which is operationally connected to, or includes, a tamper resistant security system, the tamper resistant security system including the secret $S_A$ and the at least one secret $S_B$ therein, the tamper resistant security system being operative to generate the symmetric cryptographic key KA based on the secret $S_A$ and the at least one secret $S_B$;

securing data, by the processor, using the symmetric cryptographic key KA yielding secured data; and sending, by a transmission element of the device A, the secured data to the first device which is operationally connected to, or includes, the tamper resistant security system.

2. The method according to claim 1, wherein the at least one device includes a device B and wherein the mathematical combination of the result $S_A^*$ with the at least one secret $S_B$ includes the device B mathematically combining the result $S_A^*$ with the at least one secret $S_B$ yielding the result $G^*$.

3. The method according to claim 1, wherein the at least one device includes a device C and a device D, the at least one secret $S_B$ including a secret $S_C$ and a secret $S_D$, and wherein the mathematical combination of the result $S_A^*$ with the at least one secret $S_B$ includes: the device C mathematically combining the result $S_A^*$ with the secret $S_C$ yielding a result $L^*$; and the device D mathematically combining the result $L^*$ with the secret $S_D$ yielding the result $G^*$.

4. The method according to claim 1, wherein the at least one device includes a device C and a device D, the at least one secret $S_B$ including a secret $S_C$ and a secret $S_D$, and wherein the mathematical combination of the result $S_A^*$ with the at least one secret $S_B$ includes: the device C mathematically combining the result $S_A^*$ with the secret $S_C$ yielding a result $L^*$ and the device D mathematically combining the result $S_A^*$ with the secret $S_D$ yielding the result $G^*$, wherein the method further comprises: receiving, on the communication interface, the result $L^*$; and performing, by the processor, a symmetric homomorphic decryption of data based on the result $L^*$ as input yielding a second decrypted output; and wherein the symmetric cryptographic key KA is determined based on the first decrypted output and the second decrypted output.

5. The method according to claim 1, wherein the at least one device includes a device C and a device D, the at least one secret $S_B$ including a secret $S_C$ and a secret $S_D$, and wherein the mathematical combination of the result $S_A^*$ with the at least one secret $S_B$ includes: the device C mathematically combining the result $S_A^*$ with the secret $S_C$ yielding a result $L^*$ and the device D mathematically combining the result $S_A^*$ with the secret $S_D$ yielding the result $G^*$, wherein the method further comprises: receiving, on the communication interface, the result $L^*$; and mathematically combining, by the processor, the result $L^*$ with the result $G^*$ yielding a result $M^*$; the symmetric homomorphic decryption of the data based on the result $G^*$ includes the symmetric homomorphic decryption of the result $M^*$ with the cryptographic key H as input yielding the first decrypted output.

6. The method according to claim 1, wherein the mathematical combination of the result $S_A^*$ with the at least one secret $S_B$ includes performing at least one modular mathematical operation based on the result $S_A^*$ and the at least one secret $S_B$.

7. The method according to claim 6, wherein:
the mathematical combination of the result $S_A^*$ with the at least one secret $S_B$ includes homomorphically evaluating a polynomial including substituting the result $S_A^*$ for the indeterminate of the polynomial and using the at least one secret $S_B$ for the coefficients of the polynomial; or
the mathematical combination of the result $S_A^*$ with the at least one secret $S_B$ includes homomorphically evaluating a polynomial including substituting the at least one secret $S_B$ for the indeterminate of the polynomial and using the result $S_A^*$ for the coefficients of the polynomial.

8. The method according to claim 7, wherein the polynomial has an order of $2^{50}$ or more.

9. The method according to claim 6, wherein the secret $S_A$ includes a plurality of values $S_{Ai}$, the symmetric homomorphic encryption of the secret $S_A$ including performing symmetric homomorphic encryption of each of the values $S_{Ai}$ with the cryptographic key H as input yielding a plurality of homomorphic encryption results $S_{Ai}^*$, the mathematical combinations of the results $S_A^*$ with the at least one secret $S_B$ including homomorphically evaluating a polynomial including using the results $S_{Ai}^*$ for the coefficients of the polynomial.

10. The method according to claim 9, wherein the evaluation of the polynomial is based on at least one selected from a group including homomorphic addition and homomorphic multiplication operations.

11. The method according to claim 1, wherein the symmetric homomorphic decryption is based on a polynomial or matrix homomorphic encryption/decryption method.

12. The method according to claim 1, wherein the at least one device includes a device B, the method further comprising:
receiving, on the communication interface, a result $S_E^*$ deriving from a symmetric homomorphic encryption of a secret $S_E$ by the device B, the device A not having access to the secret $S_E$;
performing, by the processor, a mathematical combination of the result $S_E^*$ with a secret $S_F$ yielding a result $P^*$; and
sending, on the communication interface, the result $P^*$ to the device B for symmetric homomorphic decryption yielding an output which is used to determine a symmetric cryptographic key KB.

13. The method according to claim 12, wherein the secret $S_F$ is the same as the secret $S_A$.

14. The method according to claim 12, wherein the secret $S_F$ is based on a hash of the secret $S_A$.

15. The method according to claim 1, wherein the secret $S_A$ is random number of length R bits, R being greater than or equal to 1000.

16. The method according to claim 15, wherein the secret $S_A$ is based on a random secret of length Q bits, Q being less than R, the method further comprising expanding a length of the secret $S_A$ from Q bits to R bits.

17. The method according to claim 16, further comprising compressing a length of the first decrypted output from R bits to Q bits.

18. The method according to claim 1, wherein:
the device A is implemented in a system of a media content provider;
the at least one device is implemented in the system of a conditional access provider;

the method further comprises encrypting media content, by the processor, using the symmetric cryptographic key KA yielding encrypted media content; and sending, on the transmission element, the secured media content to the first device which is operationally connected to, or includes, the tamper resistant security system.

19. The method according to claim 1, wherein:

the at least one device is implemented in the system of a chip manufacturer;

the secret $S_A$ is generated in the tamper resistant security system by an Applet associated with the device A; and the first device which is operationally connected to, or includes, the tamper resistant security system is a mobile device.

20. A first device comprising:

a processor to perform a symmetric homomorphic encryption of a secret $S_A$ with a cryptographic key H as input yielding a homomorphic encryption result $S_A^*$;

a communication interface:

to send the result $S_A^*$ for mathematical combination by at least one device with at least one secret $S_B$ yielding a result G*, the first device not having access to the at least one secret $S_B$, the at least one device not having access to the secret $S_A$ and not having access to the cryptographic key H, in order to provide distributed security and avoid a single point of compromise;

receive the result G*, wherein the processor is operative to: perform a symmetric homomorphic decryption of data based on the result G* with the cryptographic key H as input yielding a first decrypted output; and determine a symmetric cryptographic key KA based on the first decrypted output, for symmetric cryptographic key KA being for secure communication with a second device which is operationally connected, or includes, a tamper resistant security system including the secret $S_A$ and the at least one secret $S_B$ therein, the tamper resistant security system being operative to generate the symmetric cryptographic key KA based on the secret $S_A$ and the at least one secret $S_B$, wherein the processor to secure data using the symmetric cryptographic key KA yielding secured data; and a transmission element to send the secured data to the second device which is operationally connected to, or includes, the tamper resistant security system.

* * * * *